(12) United States Patent
Hsieh et al.

(10) Patent No.: US 9,147,225 B2
(45) Date of Patent: Sep. 29, 2015

(54) GRAPHICS PROCESSING UNIT AND MANAGEMENT METHOD THEREOF

(71) Applicant: VIA Technologies, Inc., New Taipei (TW)

(72) Inventors: Ping-Huei Hsieh, New Taipei (TW); Yi-An Chen, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 306 days.

(21) Appl. No.: 13/645,466

(22) Filed: Oct. 4, 2012

(65) Prior Publication Data

US 2013/0321437 A1    Dec. 5, 2013

(30) Foreign Application Priority Data

Jun. 5, 2012    (TW) .............................. 101120156 A

(51) Int. Cl.
*G06F 3/038* (2013.01)
*G06T 1/20* (2006.01)
*G06F 1/32* (2006.01)

(52) U.S. Cl.
CPC .............. *G06T 1/20* (2013.01); *G06F 1/3206* (2013.01); *G06F 1/3228* (2013.01)

(58) Field of Classification Search
CPC ..... G06F 1/3203; G06F 1/324; G06F 1/3296; G06F 1/329; G06F 9/5094; G06F 1/3265; G06F 1/3275; G06F 1/3287; G06F 11/3428; G06F 11/3457; G06F 1/32; G06F 1/3215; G06F 1/3228

USPC .......................................................... 345/520
See application file for complete search history.

(56) References Cited

U.S. PATENT DOCUMENTS

| 8,484,498 B2* | 7/2013 | Branover et al. ............. 713/323 |
| 8,610,727 B1* | 12/2013 | Bao et al. ...................... 345/502 |
| 2009/0109230 A1* | 4/2009 | Miller et al. .................. 345/506 |

FOREIGN PATENT DOCUMENTS

| CN | 1979433 | 6/2007 |
| CN | 101802874 | 8/2010 |
| CN | 102004543 | 4/2011 |
| TW | 200949755 | 12/2009 |

OTHER PUBLICATIONS

"Office Action of Taiwan Counterpart Application", issued on Jun. 22, 2015, p. 1-13, in which the listed references were cited.

* cited by examiner

*Primary Examiner* — Hau Nguyen
(74) *Attorney, Agent, or Firm* — Jianq Chyun IP Office

(57) ABSTRACT

A graphics processing unit (GPU) and a management method of the GPU are provided. The GPU includes at least one graphics engine and an engine manager. The graphics engine performs a video decoding function or a graphics rendering function according to a graphics command from a driver software. The engine manager records a workload index of each graphics engine. The engine manager also adjusts the work ability of one of or more of the at least one graphics engine according to an adjustment command from the driver software. The driver software provides the adjustment command according to the workload index.

19 Claims, 3 Drawing Sheets

GRAPHICS PROCESSING UNIT AND MANAGEMENT METHOD THEREOF

CROSS-REFERENCE TO RELATED APPLICATION

This application claims the priority benefit of Taiwan application Ser. No. 101120156, filed on Jun. 5, 2012. The entirety of the above-mentioned patent application is hereby incorporated by reference herein and made a part of this specification.

BACKGROUND OF THE INVENTION

1. Field of the Invention

The invention relates to a graphics processing unit (GPU), and more particularly to a management method of a GPU.

2. Description of Related Art

Most of electronic devices widely used today, such as smart phone, personal digital assistant (PDA), tablet computer, notebook computer, or desktop personal computer, are provided with power saving management function. In order to reduce power consumption or to reduce waste heat, these electronic devices are capable of performing power saving management to important elements such as processor, co-processor and chipset. There are currently several power saving management techniques based on a hardware mechanism, such as dynamical voltage/frequency scaling (DVFS) and clock gating. Since these power saving management techniques are based on a hardware mechanism, they are less flexible.

SUMMARY OF THE INVENTION

The invention provides a graphics processing unit (GPU) and a management method thereof, whereby hardware mechanism and software policy of power saving management are separated, and flexible power saving management to the GPU is performed according a workload of the GPU.

The invention proposes a graphics processing unit (GPU) comprising at least one graphics engine and an engine manager. The graphics engine performs a video decoding function or a graphics rendering function according to a graphics command from a driver software. The engine manager is coupled to each of the graphics engines, records a workload index of each of the graphics engines, and adjusts a work ability of one of or more of the at least one graphics engine according to an adjustment command from the driver software. The driver software provides the adjustment command according to the workload index.

The invention also proposes a management method of a GPU comprising the following steps. A notification signal from a GPU is received. A workload index of at least one graphics engine of the GPU is obtained according to the notification signal. An adjustment command is sent to the GPU according to the workload index of the at least one graphics engine, so as to instruct the GPU to adjust a work ability of one of or more of the at least one graphics engine.

In order to make the aforementioned features and advantages of the invention more comprehensible, embodiments accompanied with figures are described in detail below.

DESCRIPTION OF THE EMBODIMENTS

Figure 1:
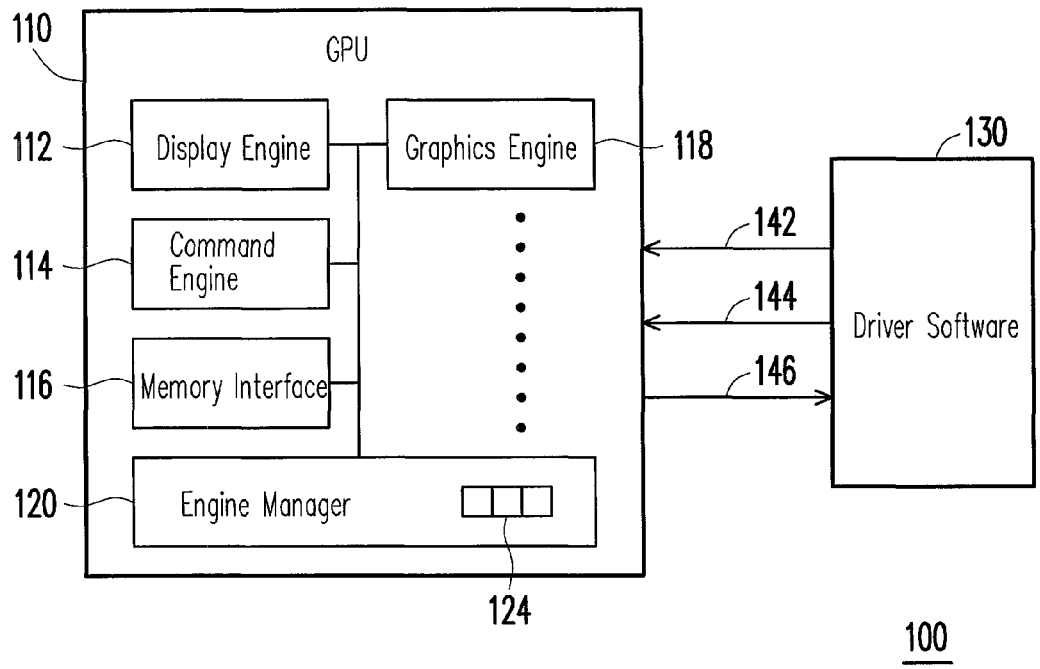
FIG. 1 is a schematic drawing of an electronic device according to an embodiment of the invention.

FIG. 1 is a schematic drawing of an electronic device 100 according to an embodiment of the invention. The electronic device 100 comprises a graphics processing unit (GPU) 110 and a driver software 130 of the GPU 110. The GPU 110 comprises a display engine 112, a command engine 114, a memory interface 116, at least one graphics engine 118 and an engine manager 120.

When an application program executed by the electronic device 100 needs to render graphics, the application program calls an application programming interface (API) provided by an operating system of the electronic device 100, such that the driver software 130 sends a graphics command 142, which is from the application program, to the GPU 110. The command engine 114 in the GPU 110 receives the graphics command 142 sent by the driver software 130, so as to analyze the type of the graphics command 142. The command engine 114 assigns the graphics command 142 to one of the graphics engines 118 according to the type of the graphics command 142. The corresponding graphics engine 118 performs a video decoding function or a graphics rendering function of the GPU 110 according to the graphics command 142.

The memory interface 116 is coupled to the graphics engine 118 and a memory (not illustrated). The memory may be either inside or outside the GPU 110. When the memory is inside the GPU 110, the memory may be a graphic memory of the GPU 110. When the memory is outside the GPU 110, the memory may be a system memory in the electronic device 100, and the system memory may be shared by a processor (not illustrated) in the electronic device 100 and by the GPU 110. Graphics data obtained by decoding or rendering by the graphics engine 118 may be stored in the memory via the memory interface 116. The display engine 112 is coupled to the memory interface 116, obtaining the graphics data via the memory interface 116 and outputting the graphics data according to a standard display interface such as a high-definition multimedia interface (HDMI) or a digital visual interface (DVI).

The engine manager 120 is coupled to each graphics engine 118 and records a workload index of each graphics engine 118. In an embodiment, the workload index is in direct proportion to a workload of the graphics engine 118. The higher the workload index, the heavier the workload of the graphics engine 118 is. The workload index may be a received workload, a completed workload, a remaining workload, or a number of idle clock cycles of the graphics engine 118 within a unit time, or a total data volume of the memory coupled to the memory interface 116 and accessed by the graphics engine 118 within a unit time.

The received workload refers to a workload of the graphics engine 118 given by the graphics command 142, and the remaining workload is obtained by subtracting the completed workload from the received workload.

As for the number of idle clock cycles, please refer to the following explanation. After receiving the graphics command 142 assigned by the command engine 114, the graphics engine 118 performs a video decoding function or a graphics rendering function corresponding to the graphics command 142. According to a work ability (e.g. a work frequency or a work voltage) of the graphics engine 118, the graphics engine 118 may complete a work corresponding to the graphics command 142 within a specific period. However, during the specific period, the graphics engine 118 is not always in a working state. For example, with a duty cycle of 100, the graphics engine 118 may be in the working state for merely 60 clock cycles, and be in an idle state for 40 clock cycles. The distribution ratio between a working state and an idle state is relevant to the graphics engine 118, and thus the number of idle clock cycles may serve as a workload index of the graphics engine 118.

As previously mentioned, after performing the video decoding function or the graphics rendering function, the graphics engine 118 stores graphics data obtained by decoding or rendering in the memory via the memory interface 116, so that the graphics data may be read by the display engine 112. Therefore, a total data volume of the memory accessed by the graphics engine 118 within a unit time is relevant to a workload of the graphics engine 118. The total data volume of the memory accessed by the graphics engine 118 within a unit time may be regarded as a workload index of the graphics engine 118. In practice, every time the graphics engine 118 decodes or renders graphics data, a specific address of the memory is assigned to store the graphics data decoded or rendered by the graphics engine 118, and the graphics data waits to be read by the display engine 112. Therefore, a total accessed data volume of the specific address in the memory within a unit time may be regarded as a workload index of the graphics engine 118. The total accessed data volume of the memory is calculated by adding up a read data volume of the memory and a written data volume of the memory.

The driver software 130 provides an adjustment command 144 to the engine manager 120 according to a workload index of any of the graphics engines 118 recorded by the engine manager 120, so as to inform the engine manager 120 to adjust the work ability of the graphics engine 118. The engine manager 120 adjusts the work ability of one of or more of the graphics engines 118 according to the adjustment command 144. In one embodiment, the engine manager 120 adjusts the work ability of a graphics engine 118 by adjusting a work voltage and/or a work frequency of the graphics engine 118. In general, the higher the work voltage and/or work frequency is adjusted to, the higher the work ability of the graphics engine 118 is; however, a power consumption of the graphics engine 118 will increase as well.

Figure 2:
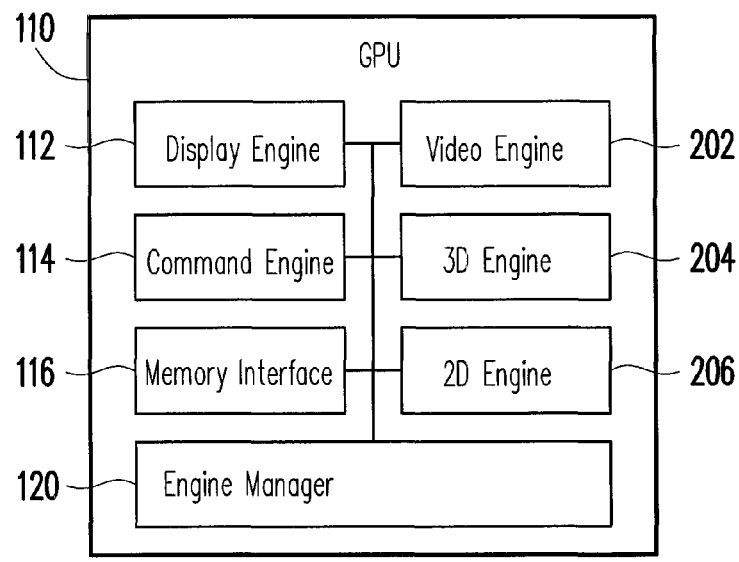
FIG. 2 is a schematic drawing of a graphics processing unit (GPU) according to an embodiment of the invention.

FIG. 2 is a schematic drawing of a GPU according to an embodiment of the invention. In FIG. 2, the GPU 110 comprises the display engine 112, the command engine 114, the memory interface 116 and a plurality of graphics engines. The plurality of graphics engines may comprise a video engine 202, a three-dimensional (3D) engine 204 and a two-dimensional (2D) engine 206, but the invention is not limited to the above three graphics engines. As previously mentioned, the command engine 114 analyzes a type of the graphics command 142. If the graphics command 142 is a video decoding command, the command engine 114 assigns the graphics command 142 to the video engine 202. The video engine 202 performs the video decoding function according to the graphics command 142. For example, the video engine 202 performs video decoding according to standards such as H.264 or Moving Picture Experts Group (MPEG). If the graphics command 142 is a three-dimensional graphics command, the command engine 114 assigns the graphics command 142 to the three-dimensional engine 204. The three-dimensional engine 204 performs a three-dimensional graphics rendering function of the graphics rendering function according to the graphics command 142. If the graphics command 142 is a two-dimensional graphics command, the command engine 114 assigns the graphics command 142 to the two-dimensional engine 206. The two-dimensional engine 206 performs a two-dimensional graphics rendering function of the graphics rendering function according to the graphics command 142.

As illustrated in FIG. 1, a workload index of a graphics engine 118 may be a received workload, a completed workload, a remaining workload, or a number of idle clock cycles of the graphics engine 118 within a unit time, or a total data volume of the memory accessed by the memory interface 116 within a unit time. The workload of different types of the graphics engines 118 may have different definitions. For example, a workload of the video engine 202 in FIG. 2 is a number of video macroblocks requiring decoding assigned by the graphics command 142. A workload of the three-dimensional engine 204 in FIG. 2 is a total area of a triangle requiring rendering assigned by the graphics command 142. A workload of the two-dimensional engine 206 in FIG. 2 is a total area of a rectangle requiring rendering assigned by the graphics command 142.

A workload of a graphics engine 118 may also be calculated by the engine manager 120 via specific formulas according to at least a received workload, a completed workload, a remaining workload, or a number of idle clock cycles of the graphics engine 118 within a unit time, or a total data volume of a memory accessed by the graphic engine 118 within a unit time. The total data volume of the memory is accessed by the graphic engine 118 via the memory interface 116 coupled to the memory.

Referring back to FIG. 1, the engine manager 120 comprises at least one set of registers 124, each set of registers 124 corresponds to one of the graphics engines 118, so as to store a workload index of the corresponding graphics engine 118. The driver software 130 provides the adjustment command 144 according to the workload index stored in the registers 124, and the details thereof will be described later. In another embodiment, each set of registers 124 further stores one or more threshold values, and the driver software 130 provides the adjustment command 144 according to the workload index and the threshold value stored in the registers 124; the details thereof will be described later as well.

The engine manager 120 periodically sends a notification signal 146 to the driver software 130 according to an interval set by the driver software 130. For example, the engine manager 120 sends out the notification signal 146 by interrupting. When receiving the notification signal 146, the driver software 130 retrieves a workload index of the graphics engine 118 from the registers 124, so as to provide the adjustment command 144 according to the retrieved workload index.

Besides the embodiment of periodically sending out the notification signal 146, in another embodiment the engine manager 120 sends the notification signal 146 to the driver software 130 when a workload index of one of the graphics engines 118 exceeds one of the threshold values corresponding to the graphics engine 118. When receiving the notification signal 146, the driver software 130 provides the adjustment command 144 according to the workload index which exceeds the threshold value. The details thereof will be described later.

Figure 3:
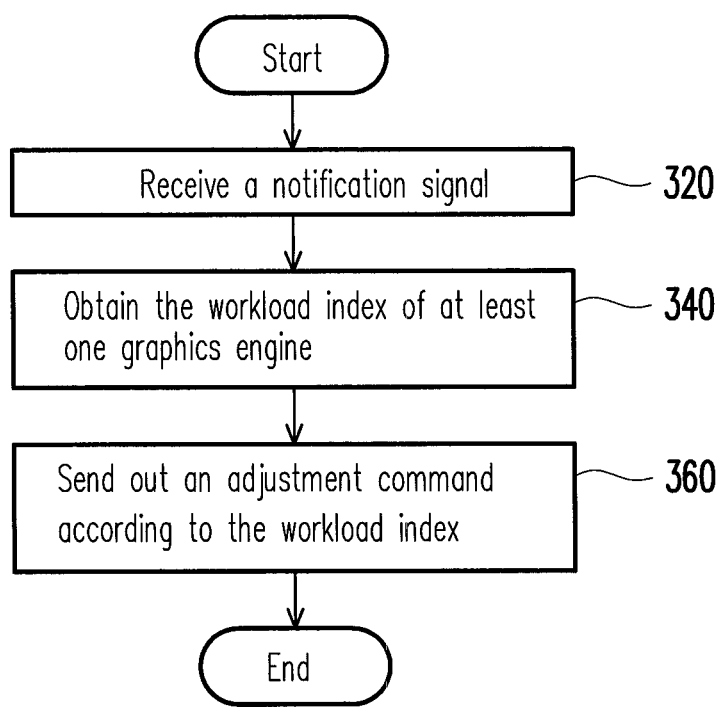
FIG. 3 is a flowchart of a management method of a GPU according to an embodiment of the invention.

FIG. 3 is a flowchart of a management method of a GPU according to an embodiment of the invention. The method may be performed by the driver software 130 to the GPU 110, or by other hardware or software capable of performing power saving management to the GPU 110. The flowchart of the method in FIG. 3 is explained hereinafter. First, in step 320, the notification signal 146 from the engine manager 120 of the GPU 110 is received. In step 340, a workload index of at least one graphics engine 118 of the GPU 110 is obtained according to the notification signal 146. Then, in step 360, according to the workload index of the at least one graphics engine 118, the adjustment command 144 is sent to the engine manager 120 of the GPU 110, so as to instruct the engine manager 120 to adjust a work ability of one of or more of the graphics engines 118 by adjusting a work voltage and/or a work frequency.

Figure 4:
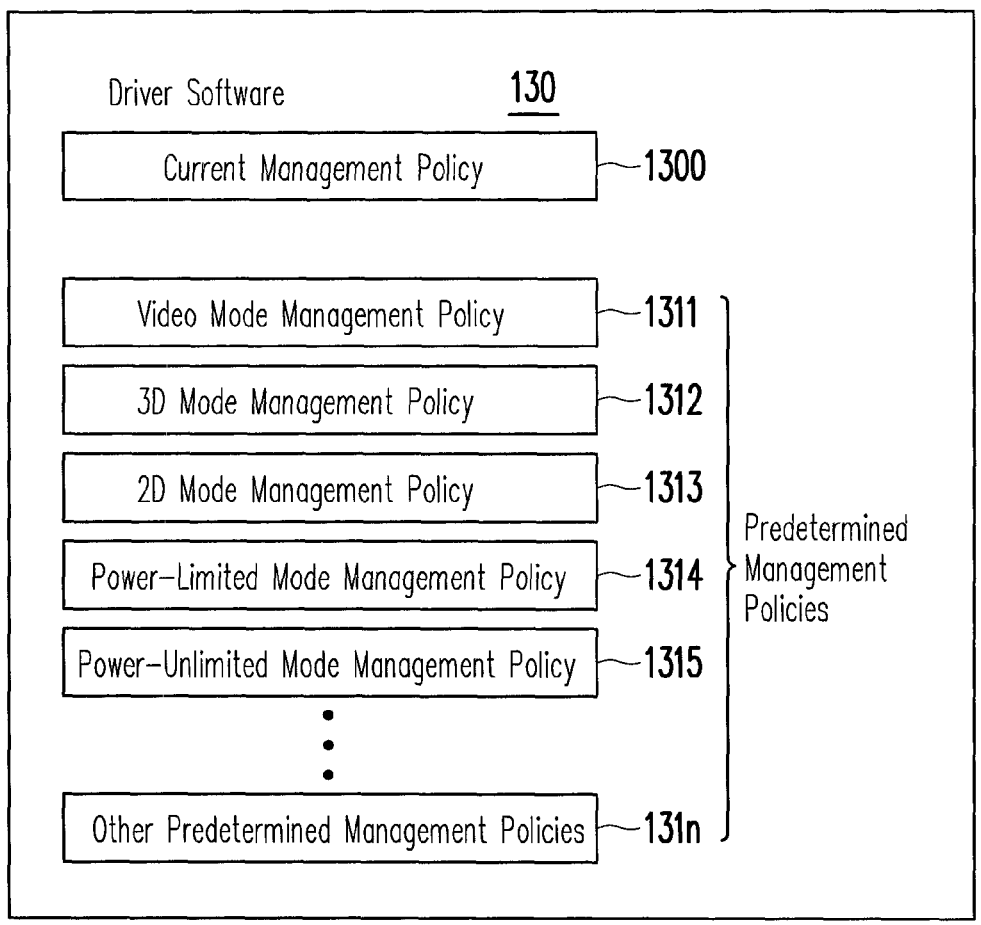
FIG. 4 is a schematic drawing of a driver software according to an embodiment of the invention.

In an embodiment, the driver software 130 sends the adjustment command 144 to the engine manager 120 of the GPU 110 according to a workload index of the graphics engine 118 and a current management policy of the driver software 130. Regarding the management policy, please refer to FIG. 4, which is a schematic drawing of a driver software of an embodiment of the invention. The driver software 130 comprises a plurality of predetermined management policies 1311~131n and a current management policy 1300. The driver software 130 selects one of the plurality of predetermined management policies 1311~131n as the current management policy 1300. Each management policy 1300 and 1311~131n comprises at least one threshold value of each graphics engine 118, several sets of work ability corresponding to different workload index of each graphics engine 118, and an adjustment rule of the work ability of each graphics engine 118. One or more threshold values of each graphics engine 118 divide a range of a workload index of the graphics engine 118 into a plurality of sections. If a workload index of the graphics engine 118 falls in one of the sections, a corresponding adjustment rule is applied to the work ability of the graphics engine 118. Each management policy 1300 and 1311~131n may have a different number of and different values of threshold values, and also a different adjustment rule. In the same management policy, there may be different numbers of and different values of threshold values, and also different adjustment rules with respect to different graphics engines. How to adjust a work voltage and/or a work frequency of each graphics engine 118 according to a workload index of the graphics engine 118 is determined by an adjustment rule of the current management policy 1300, and is informed of the engine manager 120 by the adjustment command 144.

In one embodiment, the drive 130 may automatically select one management policy as the current management policy 1300 according to a workload index of the graphics engine 118 obtained from the engine manager 120 in advance. For example, the predetermined management policies 1311~1313 are respectively a video mode management policy 1311, a three-dimensional mode management policy 1312 and a two-dimensional mode management policy 1313. The three management policies correspond to the video engine 202, the three-dimensional engine 204 and the two-dimensional engine 206 in FIG. 2, respectively. The driver software 130 analyzes workload indexes of the video engine 202, the three-dimensional engine 204 and the two-dimensional engine 206, and automatically selects the management policy corresponding to a graphics engine having a highest workload index as the current management policy 1300. In the video mode management policy 1311, the video engine 202 is classified as a main type, and the other two graphics engines (the three-dimensional engine 204 and the two-dimensional engine 206) are classified as a secondary type. In the three-dimensional mode management policy 1312, the three-dimensional engine 204 is classified as a main type, and the other two graphics engines (the video engine 202 and the two-dimensional engine 206) are classified as a secondary type. In the two-dimensional mode management policy 1313, the two-dimensional engine 206 is classified as a main type, and the other two graphics engines (the video engine 202 and the three-dimensional engine 204) are classified as a secondary type. The above three management policies set the work ability of the graphics engine(s) classified as the main type higher than the work ability of the graphics engine(s) classified as the secondary type, allowing the graphics engine(s) classified as the main type to use more power to serve its/their purpose.

The driver software 130 may select the current management policy 1300 according to a type of an application program executed by the electronic device 100. For example, when the electronic device 100 executes a video playing software, the driver software 130 selects the video mode management policy 1311. When the electronic device 100 executes a game software, the driver software 130 selects the three-dimensional mode management policy 1312. When the electronic device 100 executes a text editing software, the driver software 130 selects the two-dimensional mode management policy 1313.

The driver software 130 may select the current management policy 1300 according to an application state of the electronic device 100. For example, when the electronic device 100 is connected to a time-limited power supply such as a battery, the driver software 130 selects a power-limited mode management policy 1314 of the predetermined management policies as the current management policy 1300. When the electronic device 100 is connected to a permanent power supply such as a mains power system, the driver software 130 selects a power-unlimited mode management policy 1315 of the predetermined management policies as the current management policy 1300. In the power-limited mode management policy 1314, each graphics engine 118 is set to have a first work ability. In the power-unlimited mode management policy 1315, each graphics engine 118 is set to have a second work ability. Here, the first work ability of each graphics engine is lower than the second work ability of the same graphics engine, so as to save power of the time-limited power supply.

In addition, the driver software 130 allows a user of the electronic device 100 to select the current management policy 1300. For example, the predetermined management policies 1311~131n may be open for the user to select one as the current management policy 1300, via a utility program or an API.

The following discusses how the driver software 130 sends out the adjustment command 144 according to a workload index of the graphics engine 118 and the current management policy 1300.

In an embodiment, the driver software 130 periodically receives the notification signal 146 from the GPU 110. As for how to set a sending interval of the periodical notification signal 146, in an embodiment, the driver software 130, in advance, sends a predetermined interval corresponding to the current management policy 1300 to the engine manager 120, such that the engine manager 120 periodically sends out the notification signal 146 according to the predetermined interval. The predetermined interval may be a part of a management policy, and there may be different predetermined intervals in different management policies. When receiving such notification signal 146, the driver software 130 collects a workload index of at least one graphics engine 118 from the engine manager 120 of the GPU 110, and performs statistics or prediction of the workload index of the graphics engine 118. The driver software 130 sends the adjustment command 144 to the engine manager 120 of the GPU 110 according to the statistics or the prediction, so as to instruct the engine manager 120 how to adjust the work ability of the graphics engine 118. In an embodiment, the driver software 130 performs a statistics according to the collected workload index of the at least one graphics engine 118. For example, the workload index may be compared to at least one threshold value corresponding to the graphics engine 118 in the current management policy 1300. If the workload index exceeds a threshold value, the driver software 130 provides the adjustment command 144 to the engine manager 120, so as to instruct the engine manager 120 to adjust the work ability of the graphics engine 118 correspondingly. The details thereof will be given later. In another embodiment, the driver software 130 predicts a trend of workload index in a short-term period by using, for example, a linear extrapolation. For example, in a case a workload index of the graphics engine 118 read by the driver software 130 at the first time is 10, and the workload index of the graphics engine 118 read by the driver software 130 at the second time is 30. The driver software 130 may predict that the workload index to be read at the next time is 50 by using a linear extrapolation, and may enhance the work ability of the graphics engine 118 in advance via the adjustment command 144. In addition, the driver software 130 may switch the current management policy 1300 to another predetermined management policy according to the statistics or predicted workload index of the graphics engine 118. For example, when the current management policy 1300 corresponds to the two-dimensional mode management policy 1313, and a workload index of the three-dimensional engine 204 keeps increasing, the driver software 130 may switch the current management policy 1300 to the three-dimensional mode management policy 1312.

In an embodiment where the engine manager 120 sends out the notification signal 146 when a workload index of a graphics engine exceeds a threshold value, the driver software 130, in advance, sends at least one threshold value of the current management policy 1300 to the engine manager 120 of the GPU 110. Then, when a workload index of one of the graphics engines 118 exceeds one of the threshold values of the graphics engine 118, the driver software 130 receives the notification signal 146 from the engine manager 120 of the GPU 110. Every time such notification signal 146 is received, the driver software 130 provides the adjustment command 144 to the engine manager 120 of the GPU 110 according to the workload index which exceeds the threshold value, so as to instruct the engine manager 120 how to adjust the work ability of the graphics engine 118.

In both of the embodiment where the engine manager 120 sends out the notification signal 146 when a workload index of a graphics engine exceeds a threshold value and the embodiment where the engine manager 120 periodically sends out the notification signal 146, the driver software 130 collects a workload index of at least one graphics engine 118 from the engine manager 120 of the GPU 110 according to the received notification signal 146. As for how the driver software 130 provides the adjustment command 144 according to a workload index of the graphics engine 118 is described as following. In one embodiment, the current management policy 1300 divides the work ability of the graphics engine 118 into a plurality of levels. A threshold value of the graphics engine 118 comprises an upper threshold value and a lower threshold value, and the value of the upper threshold value is greater than the value of the lower threshold value. When the driver software 130 receives the notification signal 146, and a workload index of the graphics engine 118 exceeds a threshold value in a manner of rising to above the upper threshold value, the adjustment command 144 instructs the engine manager 120 to adjust the work ability of the graphics engine 118 up one level. As previously mentioned, a workload index of a graphics engine 118 is a received workload, a completed workload, a remaining workload, or a number of idle clock cycles of the graphics engine 118 within a unit time, or a total data volume of a memory accessed by the graphics engine 118 within a unit time. Taking the workload index of the graphics engine 118 being the number of idle clock cycles as an example, the work ability of the graphics engine 118 is increased after being adjusted up one level, which may lead to a decrease of the workload index. Therefore, after increasing the work ability of the graphics engine 118 appropriately, the workload index of the graphics engine 118 may fall back to a section smaller than the upper threshold value. By contrast, when the driver software 130 receives the notification signal 146, and a workload index of the graphics engine 118 exceeds a threshold value in a manner of descending to below the lower threshold value, the adjustment command 144 instructs the engine manager 120 to adjust the work ability of the graphics engine 118 down one level. After such adjustment, the work ability of the graphics engine 118 decreases, which may lead to an increase of the workload index (such as a number of idle clock cycles of the graphics engine 118). Therefore, after decreasing the work ability of the graphics engine 118 appropriately, the workload index of the graphics engine 118 may fall back to a section greater than the lower threshold value. If the workload index of the graphics engine 118 exceeds the upper threshold value or the lower threshold value again, the adjustment command 144 may adjust the work ability of the graphics engine 118 up or down one level correspondingly. If a workload index of the graphics engine 118 no longer exceeds the upper threshold value or the lower threshold value, the work ability of the graphics engine 118 may remain unchanged without being adjusted again.

Figure 5:
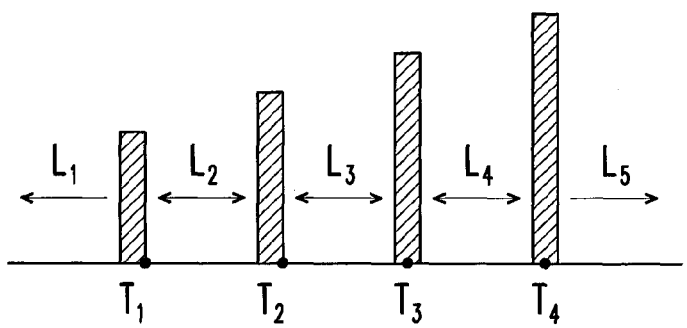
FIG. 5 is a schematic drawing of threshold values and work ability of a graphics engine according to an embodiment of the invention.

To take another example, the current management policy 1300 sets a plurality of threshold values for a graphics engine 118, and these threshold values divide the work ability of the graphics engine 118 into a plurality of levels. When the driver software 130 receives the notification signal 146 which informs that a workload index of the graphics engine 118 exceeds one of the threshold values, the adjustment command 144 instructs the engine manager 120 to set the work ability of the graphics engine 118 at a level where the workload index which exceeds the threshold value is. FIG. 5 is a schematic drawing of threshold value and work ability of an embodiment of the invention. As shown in the figure, the current management policy 1300 sets four threshold values $T_1$, $T_2$, $T_3$ and $T_4$ for a graphics engine 118, the four threshold values being sorted as $T_4$, $T_3$, $T_2$, and $T_1$ in decreasing order of value. The four threshold values divide the work ability of the graphics engine 118 into five levels, $L_1$, $L_2$, $L_3$, $L_4$ and $L_5$.

When a workload index of the graphics engine 118 is greater than the threshold value $T_4$, the work ability of the graphics engine 118 falls at level $L_5$; when a workload index of the graphics engine 118 falls between the threshold values $T_4$ and $T_3$, the work ability of the graphics engine 118 falls at level $L_4$; when a workload index of the graphics engine 118 falls between the threshold values $T_3$ and $T_2$, the work ability of the graphics engine 118 falls at level $L_3$; when a workload index of the graphics engine 118 falls between the threshold values $T_2$ and $T_1$, the work ability of the graphics engine 118 falls at level $L_2$; when a workload index of the graphics engine 118 is smaller than the threshold value $T_1$, the work ability of the graphics engine 118 falls at level $L_1$. The work ability of the graphics engine 118 corresponding to level $L_5$ is greater than that corresponding to level $L_4$; the work ability of the graphics engine 118 corresponding to level $L_4$ is greater than that corresponding to level $L_3$; the work ability of the graphics engine 118 corresponding to level $L_3$ is greater than that corresponding to level $L_2$; the work ability of the graphics engine 118 corresponding to level $L_2$ is greater than that corresponding to level $L_1$.

The following exemplifies a case where the current management policy 1300 adjusts the work ability of the graphics engine 118 according to a relationship between a workload index of the graphics engine 118 and a threshold value. Initially, a workload index of the graphics engine 118 is greater than $T_2$ and smaller than $T_3$. Then when the GPU 110 performs a video decoding function or a graphics rendering function, the workload index of the graphics engine 118 increases to greater than $T_3$ and smaller than $T_4$. Due to the workload index exceeding the threshold value $T_3$, the engine manager 120 sends out the notification signal 146. After receiving the notification signal 146, the driver software 130 sends out a corresponding adjustment command 144 to instruct the engine manager 120 to change the setting of the work ability of the graphics engine 118 from level $L_3$ to level $L_4$. If the workload index of the graphics engine 118 increases from smaller than $T_3$ to greater than $T_4$, as the workload index exceeds the threshold values $T_3$ and $T_4$, the engine manager 120 sends out the notification signal 146. After receiving the notification signal 146, the driver software 130 sends out a corresponding adjustment command 144 to instruct the engine manager 120 to directly set the work ability of the graphics engine 118 as level $L_5$.

In other embodiments of the invention, a threshold value of the current management policy 1300 is adjustable. The driver software 130 may adjust part of or all of the threshold values of at least one graphics engine 118 of the current management policy 1300 according to an adjustment rule of the current management policy 1300 and a workload index of at least one graphics engine 118. The adjusted threshold value is sent to the GPU 110, so as to update a threshold value stored in the registers 124 of the engine manager 120. For example, when a workload index of a graphics engine 118 increases rapidly, the driver software 130 may adjust one of or more of the threshold values of the graphics engine 118 up. The driver software 130, according to a user's selection or operation, stores a management policy wherein the threshold value has been adjusted in the above-mentioned manner as another management policy, for future retrieval.

In summary of the above, the invention provides a graphics processing unit (GPU) and a management method thereof, wherein independent or united power saving management is performed on each graphics engine of the GPU according to how heavy a workload of each graphics engine is. The invention separates hardware mechanism and software policy of power saving management, allowing for independent designs of both hardware mechanism and software policy. Therefore, the invention is extremely flexible.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A graphics processing unit, comprising:
   at least one graphics engine, performing a video decoding function or a graphics rendering function according to a graphics command from a driver software; and
   an engine manager, coupled to each of the graphics engines, recording a workload index of each of the at least one graphics engine, and adjusting a work ability of one of or more of the at least one graphics engine according to an adjustment command from the driver software, wherein the driver software provides the adjustment command according to a management policy and the workload index of each of the at least one graphics engine,
   wherein the management policy comprises:
   setting that each of the at least one graphics engine has a first work ability corresponding to a time-limited power supply; and
   setting that each of the at least one graphics engine has a second work ability corresponding to a permanent power supply, wherein the first work ability of each of the at least one graphics engine is lower than the second work ability of the same graphics engine.

2. The graphics processing unit as claimed in claim 1, wherein the at least one graphics engine comprises:
   a video engine, performing the video decoding function according to the graphics command;
   a three-dimensional engine, performing a three-dimensional graphics rendering function of the graphics rendering function according to the graphics command; and
   a two-dimensional engine, performing a two-dimensional graphics rendering function of the graphics rendering function according to the graphics command.

3. The graphics processing unit as claimed in claim 1, further comprising:
   a command engine, coupled to the at least one graphics engine, receiving the graphics command from the driver software, analyzing a type of the graphics command, and assigning the graphics command to one of the at least one graphics engine according to the type of the graphics command;
   a memory interface, coupled to the at least one graphics engine and a memory, graphics data obtained by decoding or rendering by the at least one graphics engine being stored in the memory via the memory interface; and
   a display engine, coupled to the memory interface, obtaining the graphics data via the memory interface, and outputting the graphics data according to a standard display interface.

4. The graphics processing unit as claimed in claim 1, wherein the workload index of each of the at least one graphics engine is a received workload, a completed workload, a remaining workload, or a number of idle clock cycles of the graphics engine within a unit time, or a total data volume of a memory accessed by the graphics engine within the unit time.

5. The graphics processing unit as claimed in claim 1, wherein the workload index of each of the at least one graphics engine is calculated according to at least one of a received workload, a completed workload, a remaining workload, or a number of idle clock cycles of the graphics engine within a unit time, or a total data volume of a memory accessed by the graphics engine within the unit time.

6. The graphics processing unit as claimed in claim 1, wherein the engine manager comprises at least one set of registers, each of the at least one set of registers corresponding to one of the at least one graphics engine and storing the workload index of the corresponding graphics engine.

7. The graphics processing unit as claimed in claim 6, wherein the engine manager periodically sends a notification signal to the driver software according to an interval set by the driver software, such that the driver software retrieves the workload index of the at least one graphics engine from the at least one set of registers when receiving the notification signal, and the driver software provides the adjustment command according to the workload index.

8. The graphics processing unit as claimed in claim 6, wherein each of the at least one set of registers of the engine manager further stores at least one threshold value of the corresponding graphics engine, and the engine manager sends a notification signal to the driver software when the workload index of one of the at least one graphics engine exceeds one of the at least one threshold value of the corresponding graphics engine, such that the driver software provides the adjustment command according to the workload index which exceeds the threshold value when receiving the notification signal.

9. The graphics processing unit as claimed in claim 1, wherein the engine manager adjusts the work ability of one of or more of the at least one graphics engine by adjusting a work voltage and/or a work frequency of one of or more of the at least one graphics engine.

10. A management method of a graphics processing unit, comprising:
    receiving a notification signal from the graphics processing unit;
    obtaining a workload index of at least one graphics engine of the graphics processing unit according to the notification signal; and
    sending an adjustment command to the graphics processing unit according to a management policy and the workload index of the at least one graphics engine, so as to instruct the graphics processing unit to adjust a work ability of one of or more of the at least one graphics engine,
    wherein the management policy comprises:
    setting that each of the at least one graphics engine has a first work ability corresponding to a time-limited power supply; and
    setting that each of the at least one graphics engine has a second work ability corresponding to a permanent power supply, wherein the first work ability of each of the at least one graphics engine is lower than the second work ability of the same graphics engine.

11. The management method of the graphics processing unit as claimed in claim 10,
    wherein the management policy further comprises:
    at least one threshold value of each of the at least one graphics engine;
    the work ability of each of the at least one graphics engine corresponding to the workload index; and
    an adjustment rule of the work ability of each of the at least one graphics engine.

12. The management method of the graphics processing unit as claimed in claim 11, wherein the management policy further comprises:
    classifying the at least one graphics engine into a main type and a secondary type, and setting the work ability of the at least one graphics engine classified as the main type higher than the work ability of the at least one graphics engine classified as the secondary type.

13. The management method of the graphics processing unit as claimed in claim 11, further comprising:
    periodically receiving the notification signal from the graphics processing unit according to a predetermined interval corresponding to the management policy;
    collecting the workload index of the at least one graphics engine from the graphics processing unit when receiving the notification signal;
    performing statistics or prediction of the workload index of the at least one graphics engine; and
    sending the adjustment command to the graphics processing unit or switching the management policy according to the statistics or the prediction.

14. The management method of the graphics processing unit as claimed in claim 11, further comprising:
    sending the at least one threshold value of each of the at least one graphics engine to the graphics processing unit;
    receiving the notification signal from the graphics processing unit when the workload index of one of the at least one graphics engine exceeds one of the at least one threshold value of the graphics engine; and
    providing the adjustment command to the graphics processing unit according to the workload index which exceeds the threshold value when receiving the notification signal.

15. The management method of the graphics processing unit as claimed in claim 14, wherein the work ability of the graphics engine corresponding to the workload index which exceeds the threshold value is divided into a plurality of levels, the at least one threshold value of the graphics engine comprises an upper threshold value and a lower threshold value, the upper threshold value is greater than the lower threshold value, and the steps of providing the adjustment command according to the workload index which exceeds the threshold value comprise:
    the adjustment command adjusting the work ability of the graphics engine up one level when the workload index exceeds the threshold value in a manner of rising to above the upper threshold value; and
    the adjustment command adjusting the work ability of the graphics engine down one level when the workload index exceeds the threshold value in a manner of descending to below the lower threshold value.

16. The management method of the graphics processing unit as claimed in claim 14, wherein the at least one threshold value of the graphics engine corresponding to the workload index which exceeds the threshold value comprises a plurality of threshold values, the plurality of threshold values divide the work ability of the graphics engine into a plurality of levels, and the adjustment command setting the work ability of the graphics engine at the level where the workload index which exceeds the threshold value is.

17. The management method of the graphics processing unit as claimed in claim 11, further comprising:
    adjusting part of or all of the at least one threshold value of the at least one graphics engine of the management policy according to the adjustment rule of the management policy and the workload index of the at least one graphics engine.

18. The management method of the graphics processing unit as claimed in claim 17, further comprising:
    storing the adjusted at least one threshold value as another management policy.

19. The management method of the graphics processing unit as claimed in claim 10, wherein the steps of instructing the graphics processing unit to adjust the work ability of one of or more of the at least one graphics engine comprise:

adjusting the work ability of one of or more of the at least one graphics engine by adjusting a work voltage and/or a work frequency of one of or more of the at least one graphics engine.

\* \* \* \* \*